United States Patent [19]
Demetrescu

[11] 3,893,433
[45] July 8, 1975

[54] ROTARY ENGINE WITH ROTATING CYLINDERS

[75] Inventor: Mihai C. Demetrescu, Irvine, Calif.

[73] Assignee: Resonance Motors, Inc., Monrovia, Calif.

[22] Filed: July 2, 1973

[21] Appl. No.: 375,394

[52] U.S. Cl. .......................................... 123/45 A
[51] Int. Cl. .......................................... F02b 53/00
[58] Field of Search .... 123/45 A, 43 C, 43 R, 58 C, 123/59 B, 59 AB; 74/57; 60/39.55

[56] References Cited
UNITED STATES PATENTS

| | | | |
|---|---|---|---|
| 1,321,045 | 11/1919 | Hutchinson | 123/43 C |
| 1,572,068 | 2/1926 | Gould | 123/58 C |
| 2,401,466 | 6/1946 | Davis et al. | 123/58 C |
| 2,962,008 | 11/1960 | Hopkins | 123/58 C |
| 3,598,094 | 8/1971 | Odawara | 123/58 C |
| 3,693,347 | 9/1972 | Kydd et al. | 60/39.55 |

OTHER PUBLICATIONS

Nicholls et al., Inlet Manifold Water Injection For Control of Nitrogen Oxides, January 1969.

*Primary Examiner*—William L. Freeh
*Assistant Examiner*—Gregory Paul LaPointe
*Attorney, Agent, or Firm*—Nilsson, Robbins, Bissell, Dalgarn & Berliner

[57] ABSTRACT

A rotary engine is disclosed in which annular gas-expansion chambers are defined by structure including reciprocating pistons. A sinusoidal coupling translates reciprocating motion of the pistons to include rotation, to propel the expansion chambers as well as an applied load. As disclosed, the engine is in the form of an internal-combustion unit. A centrifugal-force structure is incorporated in the engine to provide a force that is related to the reciprocating displacement so as to attain a resonant mechanical system. A specific form of valving is disclosed utilizing an axial shaft. Additionally, in one embodiment, the system is disclosed to include structure for introducing liquid, e.g. water, into the expansion chambers, to be confined at the peripheries of such chambers at a location intimately available and operative to modify the basic cycle. As disclosed in detail, the engine inherently affords various desirable operating characteristics including clean operation and stratified-charge combustion.

14 Claims, 15 Drawing Figures

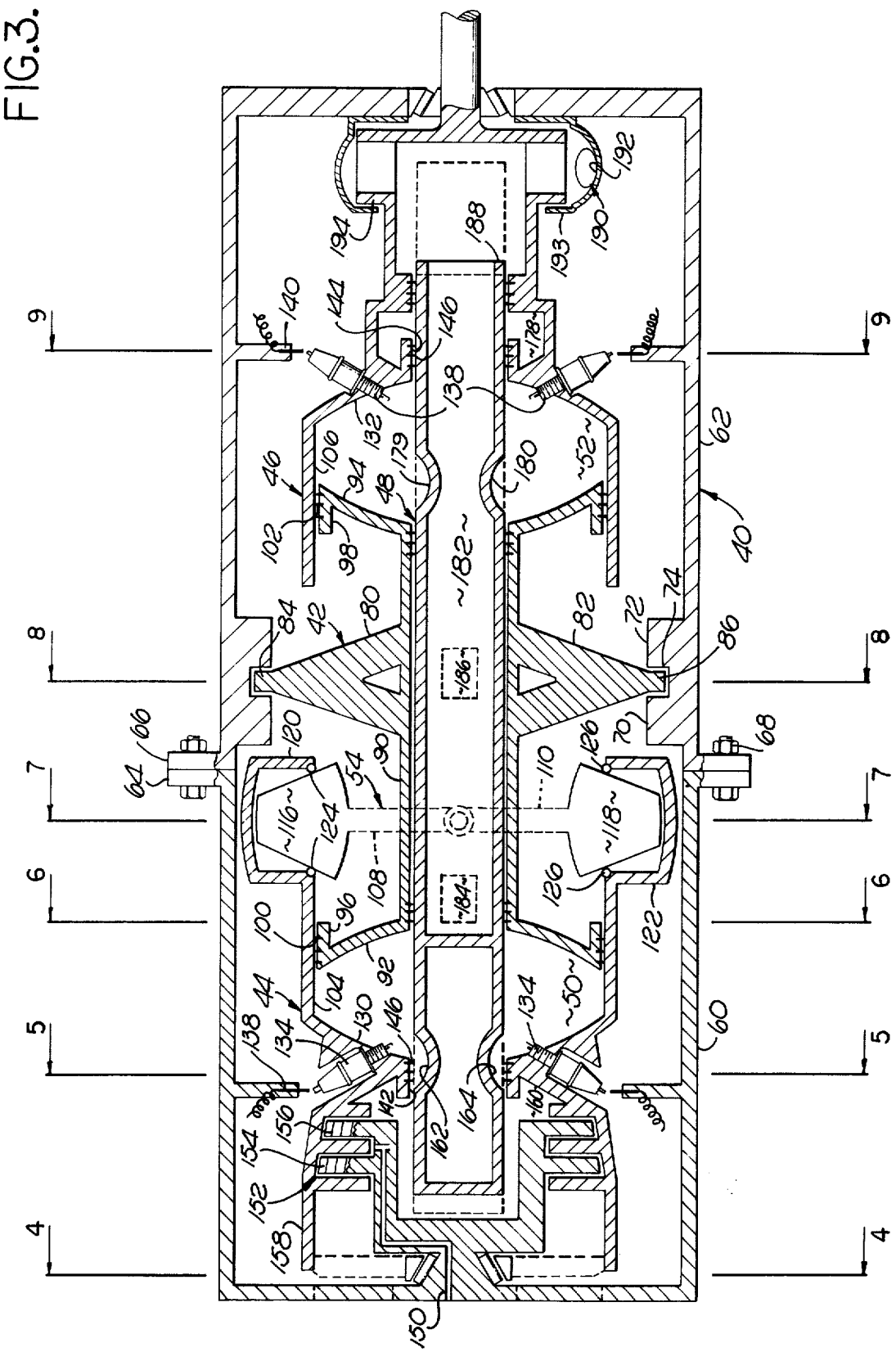

ROTARY ENGINE WITH ROTATING CYLINDERS

The subject matter disclosed herein is pertinent and related to the subject matter of Disclosure Document 016415 of Jan. 31, 1973, as recorded in the U.S. Patent Office.

BACKGROUND AND SUMMARY OF THE INVENTION

During the past several years, considerable interest and development effort have been devoted to various forms of rotary engines as may be used in automobiles. Generally, rotary engines might be classified to include one group in which the motion is exclusively rotary and another group wherein the rotary motion is accompanied by another motion component. The engine of the present invention relates to the latter class in that rotary motion is developed from a reciprocating motion pattern. In that regard, however, the present invention may be embodied in various forms to provide inherently the distinct advantages of rotary engines.

As disclosed in detail herein, the present invention may be embodied in the form of an internal-combustion engine. At present, considerable concern exists with regard to the volume of pollutants resulting from the operation of such engines. Of course, the overall efficiency of an engine is directly related to its pollution contribution. Consequently, engines having improved efficiency are needed. Additionally, considerable effort has been expended toward the development of structures for treating the exhaust stream from an internal combustion to remove certain pollutants. As still another consideration, intense efforts have also been made to develop engines in which combustion of the fuel results in fewer serious contaminants, e.g. nitrous oxide. In general, the engine of the present invention inherently affords embodiments that are relatively clean with respect to each of the above considerations.

In addition to the advantages attendant rotary engines, e.g. smooth operation, and the importance of the adoption of a substantially-clean engine in the near future, other desirable characteristics for an internal-combustion engine include relatively small size, relatively few component parts, relatively simple maintenance requirements (as avoiding difficult seals) and a capability for relatively inexpensive production. In general, embodiments of the present invention can be constructed to afford a significant improvement with regard to each of these desirable characteristics.

In general, the engine of the present invention utilizes the energy of expanding gases, as from the combustion of fuel in a mixture with air, to accomplish reciprocation of a piston means. The reciprocating pattern of the piston means along with combustion chamber means) is translated to include a rotary component so that, as disclosed, the entire combustion structure revolves as it reciprocates. A centrifugal-force mechanism (actuated by rotation) is incorporated with the combustion structure to attain a mechanically-resonant oscillating system. Furthermore, the system offers the capability of maintaining mechanical resonance at various operating speeds.

A disclosed embodiment of the present invention incorporates a concentric structure enabling relatively simple valving by a single sliding member to attain a power stroke which is longer than the compression stroke and thereby improve efficiency. The concentric embodiment also provides centrifugal forces with the result that water (or other liquid) may be injected into the combustion cylinder to be contained at the annulus of the cylinder by centrifugal force. The liquid affords intimate cooling and may be employed to modify the thermodynamic cycle of the engine. Additionally, the liquid may serve to entrap and confine various pollutants.

BRIEF DESCRIPTION OF THE DRAWINGS

The drawings, disclosing illustrative embodiments of the present invention, serve to present the various objectives and advantages hereof and are as follows:

FIG. 3 is a central vertical sectional view taken through the engine portion of the system of FIG. 1;

DESCRIPTION OF THE ILLUSTRATIVE EMBODIMENTS

The disclosed embodiments exemplify the invention in what is presently considered the best mode of operation for that purpose recognizing, of course, that the invention may be embodied in various other forms some of which may be radically different from the illustrative embodiments. However, the specific structural and functional details disclosed herein are representative and provide the basis for the claims herein which define the scope of the invention.

Figure 1:
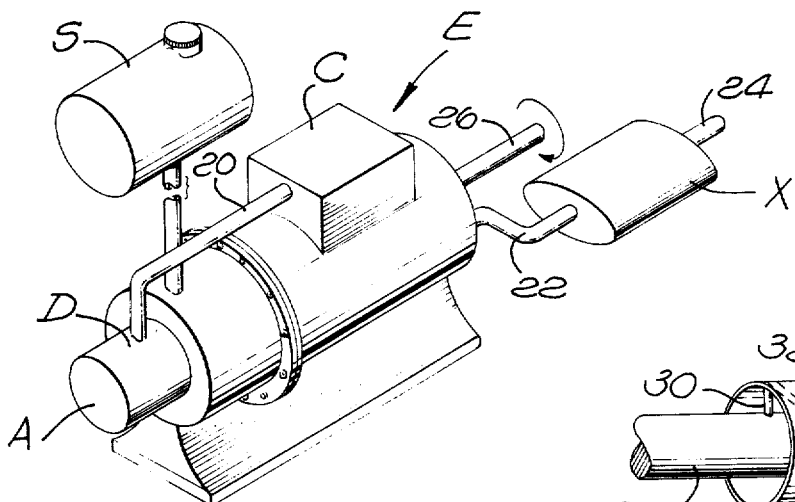
FIG. 1 is a perspective view of an engine constructed in accordance with the present invention.

Referring initially to FIG. 1, there is shown an engine E embodying the present invention in the form of an internal-combustion system. Fuel is received by the engine E from a fuel source S and supplied through a delivery unit D which receives air through an air filter A to provide combustion charges for the engine E. The products of combustion from the engine E are passed to an exhaust unit X from which spent gases are discharged.

Considering the system of FIG. 1 in somewhat greater detail, the fuel source S provides gasoline for mixture with air that is received through the air filter A. The fuel charges are controlled by the fuel delivery unit D and as disclosed in detail below the fuel-air ratio may be varied during the course of supplying charges to the engine E. Control of the fuel delivery unit D is provided by a control unit C which is coupled to the delivery unit D through a cable 20.

The control unit C senses the positional state of moving components within the engine E to develop an electrical synchronizing signal. As indicated above, the synchronizing signal is developed to control the supply of combustible charges to the engine E. Additionally, the synchronizing signal controls the ignition system (embodied in the control unit C) for igniting fuel charges in the engine E.

Also as suggested above, the products of combustion from the engine E are passed to an exhaust unit X. Specifically, a duct 22 is connected between the engine and the exhaust unit X from which a tailpipe 24 emerges to carry exhaust gases, as to the atmosphere. The exhaust unit X may simply comprise a conventional muffler; however, alternatively, in one embodiment as disclosed below, the exhaust unit X may include a condenser for liquefying a component of the exhaust stream as to trap substantial quantities of pollutants.

Output energy from the engine E is provided as a torque on the rotary shaft 26. Of course, the shaft 26 may be coupled variously to any of a variety of loads as through torque converters and similar structures as well known and widely used.

Considering the operation of the engine E in somewhat greater detail, although the shaft 26 provides energy in the form of a rotary output, the motion patterns within the engine E are somewhat more complex. That is, although the shaft 26 revolves, the drive components for the shaft 26 (located within the engine E) also experience a reciprocating motion pattern. The complex motion pattern that occurs within the engine E will now be considered in a preliminary manner with reference to FIG. 2. A shaft 28 (fragmentarily illustrated) is supported (mounting not shown) for both rotary and axially reciprocating motion. A key or stud 30 extends radially from the shaft 28 to engage a sinusoidal groove 32 defined on the inside cylindrical surface of a guide cylinder 34.

Figure 2:
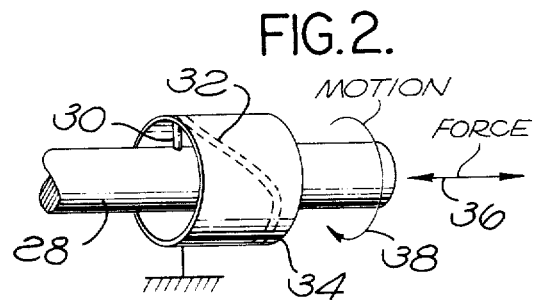
FIG. 2 is a diagram illustrative of a motion pattern developed in the system of FIG. 1.

Assuming now that the shaft 26 is fixed against radial displacement while being supported for rotation and axial reciprocation, it may be seen that the shaft must revolve to reciprocate. That is, if the shaft 28 is reciprocated by applied forces indicated by the line 36, the engagement between the shaft 28 and the cylinder 34 will force the shaft to rotate in a motion pattern as indicated by the line 38. Generally, in the disclosed embodiments of the present invention, the core of the engine is forced to reciprocate by the expanding gases of combustion. A coupling structure, somewhat as illustrated in FIG. 2, is then provided to translate the reciprocating motion into a rotary motion pattern.

The complex motion pattern (reciprocating and revolving) as described affords a number of distinct advantages which are considered in detail below. However, in general, the rotary motion affords smooth drive power while the reciprocating motion accommodates an expansion engine piston structure and is utilized to attain a condition of mechanical resonance. That is, as disclosed in detail below with reference to the illustrative embodiments, the shaft 28 (FIG. 2) operates in an oscillatory system with the result that it reciprocates or oscillates in a condition of mechanical resonance. Consequently, in a large measure, engines in accordance with the present invention process essentially the energy provided at an output shaft.

Turning now to the actual structure inside the engine E, reference will be made to FIG. 3. An external housing 40 of cylindrical configuration generally affords a stationary reference for the internal moving components. The relative motion between the internal structure and the housing 40 is generally as described with reference to FIG. 2.

A piston structure 42, coaxial and somewhat centrally positioned in the housing 40, is referenced to the housing to move in the described complex (sinusoidal) pattern. The piston structure 42 defines combustion chambers in association with integral cylinder means 44 and 46 which also move in the complex motion pattern. Also, extending coaxially within the housing 40 as well as coaxial with the piston structure 42 and the cylinder means 44 and 46 is a central shaft 48. Valving for the control of power gases (intake and exhaust) is accomplished by relative motion of the central shaft 48 with the piston structure 42 and the cylinder means 44 and 46. Thus, although the central shaft 48 revolves and reciprocates along with the piston structure 42 (as well as the cylinder means 44 and 46) all with reference to the housing 40, the central shaft motion pattern is phase displaced from the piston structure 42 to accomplish valving operations. Although the relationship of the motion patterns is considered in detail below, FIG. 10 (graphically depicting the positional relationships) may merit a brief inspection at this point.

Pursuing the consideration of structural details as shown in FIG. 3, it is to be noted that a pair of annular combustion chambers 50 and 52 are defined between the piston structure 42 and the cylinder means 44 and 46, respectively. Charges of fuel are burned alternately in the chambers 50 and 52 to produce expanding gases for driving the engine. The reciprocating component of the internal motion pattern results in various angular relationships for a centrifugal-force mechanism 54 which functions in combination with the total moving apparatus to accomplish the condition of mechanical resonance. Such operation of the system is particularly significant because the mechanically resonant state is preserved to a large measure with variations in engine speed. In that regard, resonant engines have been previously proposed; however, constant operating speed has generally been a characteristic of such engines.

In view of the above preliminary description, a more-detailed description of the identified component parts will now be provided. Upon the completion of such a description, the basic operation of the system will be treated and expanded to complete the details of operation.

The housing 40 simply comprises a pair of cylindrical members 60 and 62 substantially closed at the outer ends and abutted together in facing relationship along a pair of flanges 64 and 66, respectively, through which fasteners 68 are affixed. The interior of the housing member 60 (left) defines a simple right-circular cylinder. However, the interior of the housing member 62 (right) defines ridges 70 and 72 with the sinusoidal groove 74 therebetween. Of course, the groove 74 is annular, lying in a closed, circular path; however, a rolled or flat projection of the groove 74 would reveal a shape as indicated by the curve 76 (FIG. 10) with two sinusoidal cycles being developed around the cylindrical housing member 62. Consequently, two complete cycles of reciprocation by the integral piston structure 42 result in one revolution of that structure.

Figure 8:
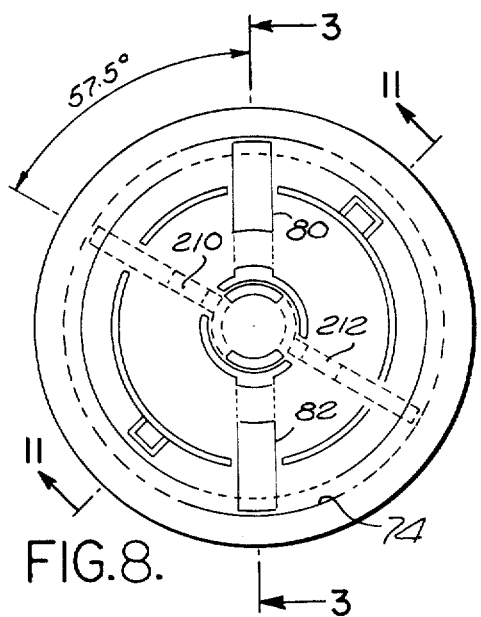
FIG. 8 is a vertical sectional view taken along line 8—8 of FIG. 3.
Figure 9:
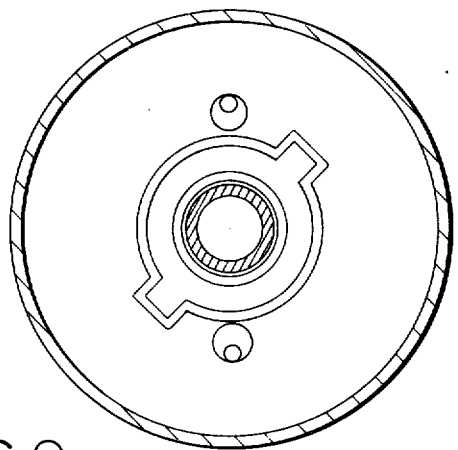
FIG. 9 is a vertical sectional view taken along line 9—9 of FIG. 3.

The piston structure 42 includes a pair of diametrically-opposed radial arms 80 and 82, the ends of which define cam surfaces 84 and 86 which are received in the groove 74. The arms 80 and 82 (see also FIG. 8) may be dynamically balanced in operating combination with the remainder of the piston structure 42.

At the internal terminations of the arms 80 and 82, these elements are integral with a sleeve 90 (FIG. 3) which is concentric with the central shaft 48. At the external ends of the sleeve 90, spherically tapering flanges are provided to define annular pistons 92 and 94. Rim sections 96 and 98, respectively, are provided at the external peripheries of the pistons 92 and 94 to carry piston rings 100 and 102, respectively. Sealing engagement between the pistons 92 and 94 is accomplished by the rings 100 and 102 with the internal cylinder walls 104 and 106, respectively, of the cylinder means 44 and 46.

Recapitulating to some extent, it is to be understood that as charges of fuel are alternately burned in the combustion chambers 50 and 52, the forces resulting from the expanding gases are applied through the pistons 92 and 94 to reciprocate the piston structure 42, which reciprocation is accompanied by a rotary movement resulting from the engagement of the arms 80 and 82 with the sinusoidal, annular groove 74. As the piston structure 42 revolves, it also turns the cylinder means 44 and 46 with the result that the entire internal structure (including the centrifugal-force mechanism 54) revolves with reference to the external housing 40.

Figure 7:
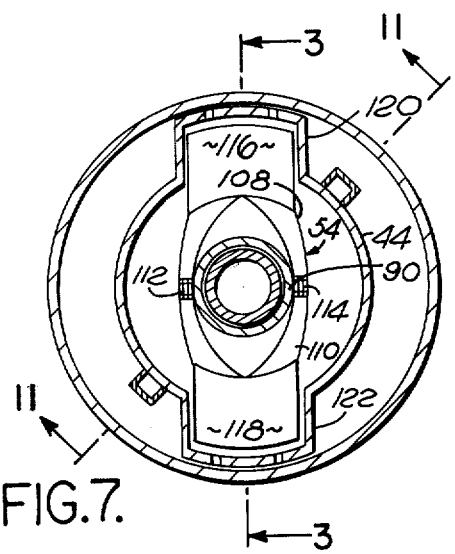
FIG. 7 is a vertical sectional view taken along line 7—7 of FIG. 3.

The centrifugal-force mechanism 54 (see also FIG. 7) includes diametrical, radially-extending yokes 108 and 110 (FIG. 7) which are affixed to the sleeve 90 at diametrically-opposed pivot supports 112 and 114. At the external ends of thhe yokes 108 and 110, weights 116 and 118 (FIGS. 3 and 7) are carried, and are received in force-transfer boxes 120 and 122 which are integral with the cylinder means 44, simply comprising extensions thereof. Bearings 124 (FIG. 3) are provided between the force-transfer box 120 and the weight 116, with similar bearings 126 separating the weight 118 from the force-transfer box 122.

With the mechanism 54 in the position as illustrated in FIG. 3, rotation does not result in the application of any substantial forces to the cylinder means 44 and 46 through the force-transfer boxes 120 and 122. However, as the piston structure 42 is displaced axially in relation to the cylinder means 44 and 46, the yokes 108 and 110 assume acute angles with reference to the sleeve 90 and as a consequence, forces are applied to the cylinder means 44. Specifically, for example, if the sleeve 90 is displaced to the right with reference to the cylinder means 44, acute angles are defined on the left side of the yokes 108 and 110. As a consequence, the weights 116 and 118 apply centrifugal forces to the bearings 124 and 126 carried on the left side of the force-transfer boxes 120 and 122. The reaction of such forces tends to urge the sleeve 90 to the left and, accordingly, oppose the initially-assumed offset or displacement to the right. As developed in detail below, the magnitude of such forces is dependent upon the speed of the system, e.g. centrifugal force. As the rotational speed is locked in synchronism with the reciprocating speed, the varying centrifugal forces may be employed to maintain a condition of mechanical resonance over a wide range of speed.

Generally, the conditions for mechanical resonance involve an oscillatory system in which an opposing force is developed in relation to the degree of displacement. As suggested, the opposing force is dependent upon the frequency of oscillation. In the present system, the frequency of oscillation is related directly to the rotational speed which is in turn related to the force developed by the centrifugal-force mechanism 54. Consequently, an oscillatory system is provided that can maintain the condition of mechanical resonance over a wide range of speed. An analytical representation is provided by FIG. 15 and will now be considered in detail.

Figure 15:
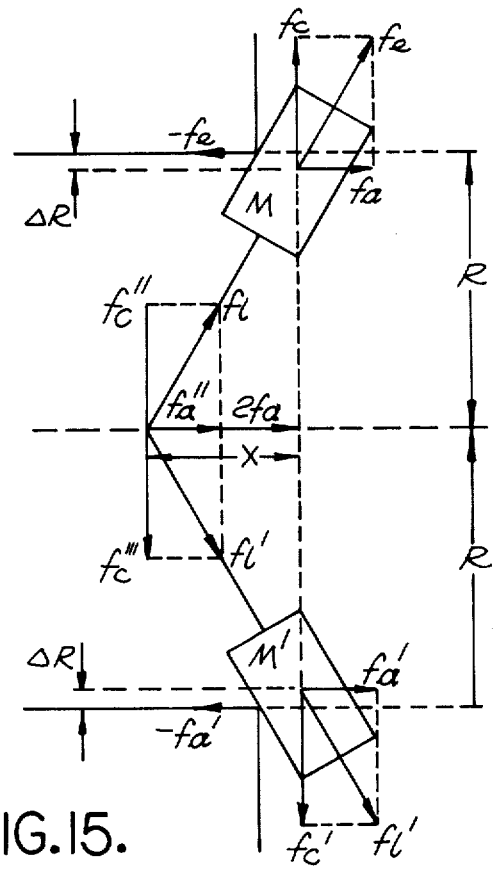
FIG. 15 is a force diagram somewhat explanatory of the operation of the engine in the system of FIG. 1.

The two weights 116 and 118 (FIG. 3) are represented as masses M and M' (FIG. 15) which are deemed to be revolved at a radius R. As a consequence of the revolution, centrifugal forces $f_c$ and $f_c'$ are developed which vary as: the mass M, the quantity $(2\pi F)^2$ (where F is the frequency), and the true radius $(R-\Delta R)$ as indicated in FIG. 15. As the variation of the distance $\Delta R$ will be very slight, the value of R may be employed in the computation without substantial compromise. As a consequence, $f_c$ approximates $M\omega^2 R$.

Considering the force diagram of FIG. 15, it may be seen that by reason of ratios: $f_a/f_c = X/R$ where $X$ is the displacement of the sleeve 90. Solving for $f_a = f_c X/R = M\omega^2 X$. Of course, $f_a' = f_a$ and as both forces are applied, the aggregate force may be considered $2f_a = 2M\omega^2 X = K_c X$, which is the restoring force applied upon displacement of sleeve 90.

Relating the above considerations to a conventional oscillatory system involves the well known equation: $\omega_{osc} = K_o \sqrt{K_s/M}$, where $K_s$ is the spring constant and M is the mass. Thus:

$\omega_{osc}$ approximates $K_o$ $\qquad \sqrt{\dfrac{K_c}{M}} = K_o \qquad \sqrt{\dfrac{2m\omega^2}{M}} = K_o' \omega.$ Accordingly, it may be seen that $\omega_{osc}$ involving the resonant frequency of oscillation is related by a linear constant to the angular velocity $\omega$ of the mechanical system hereof e.g., as illustrated herein (FIG. 10) $k_o'$ being two.

Returning now to further detailed consideration of the engine as illustratively disclosed herein with reference to FIG. 3, the combustion chambers 50 and 52 involve dome head portions 130 and 132, respectively. Pairs 134 and 138 of spark plugs are mounted in the sections 130 and 132, respectively, for alternately igniting fuel charges as will be explained in detail below. Generally, the spark plugs in each cylinder are provided in pairs for dynamic balance and to more-uniformly detonate fuel charges. ignition sparks for the pairs 134 and 136 of plugs are provided, respectively, through conductor rings 138 and 140 concentrically supported within the housing 40.

At the external end of the dome sections 130 and 132 bores 142 and 144, respectively, are defined which pass the ported valving portions of the central shaft 48. As indicated, sealing rings 146 are provided between these elements as disclosed in detail below, the central shaft 48 is keyed for a motion pattern that is phase displaced with reference to the piston means 42.

Pursuing the explanation of the engine E in a somewhat different regard, the fuel-flow path will now be described. The fuel (e.g. gasoline) is introduced into the engine E through a port 150 (FIG. 3, extreme left) which is defined through the housing 40 to enter the interior of a turbine structure 152. A pair of turbo wheels 154 and 156 are fixed by attachment to the housing 40 as indicated, while a mating shroud 158 is affixed to the cylinder means 44 with the result that the shroud revolves about the wheels 154 and 156. The relative motion is the significant consideration and in that regard, as the shroud 158 revolves, a positive pressure is developed in the space 160, drawing intimately mixed fuel-air charges into that space. From the space 160 combustible charges are supplied to the combustion chambers 50 and 52 as will now be explained in detail.

Figure 4:
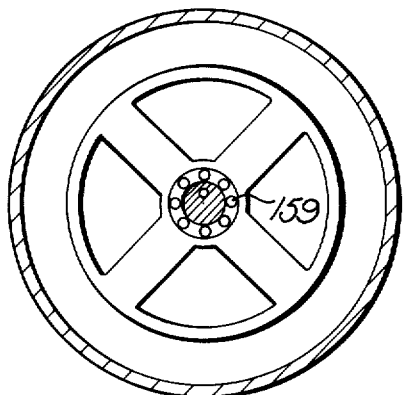
FIG. 4 is a vertical sectional view taken along line 4—4 of FIG. 3.
Figure 5:
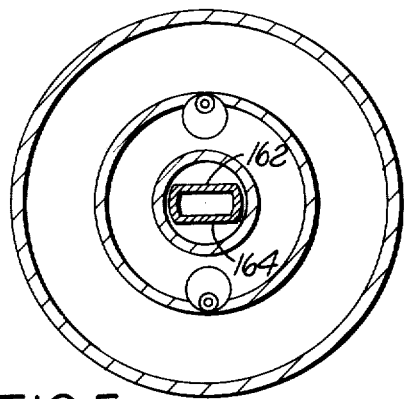
FIG. 5 is a vertical sectional view taken along line 5—5 of FIG. 3.
Figure 6:
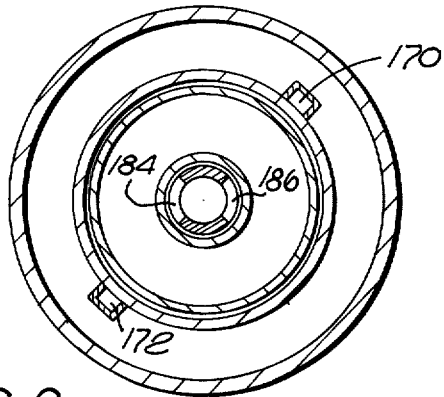
FIG. 6 is a vertical sectional view taken along line 6—6 of FIG. 3.

The intermittently-opening passage from the space 160 to the chamber 50 is provided by arcuate indentations 162 and 164 (see also FIG. 5) which are located at diametrically-opposed sections of the central shaft 48. That is, as the central shaft 48 reciprocates in the opening or bore 142, the indentations 162 and 164 are periodically located in the bore 142 and permit the passage of fuel-air charges that have been pressurized by the turbine wheels 154 and 156. It is here noteworthy that the turbine structure 152 is carried on bearings 159 (FIG. 4) a similar set of which afford rotary support at the opposite end of the housing 40.

Figure 11:
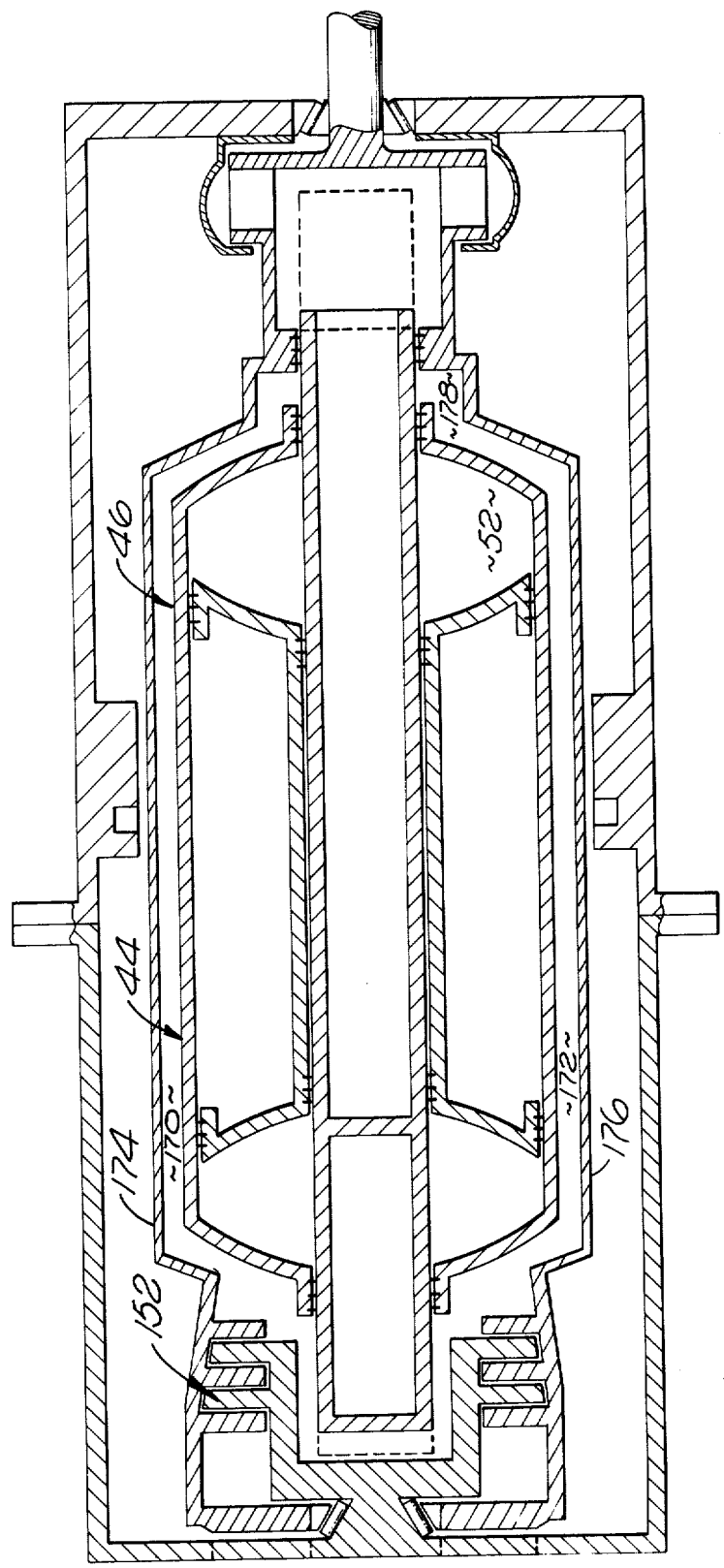
FIG. 11 is a vertical sectional view similar to FIG. 3 taken along an angularly-displaced plane.

The fuel-air mixture provided from the turbine structure 152 (FIG. 11) is supplied to the combustion chamber 52 through passages 170 and 172 (see also FIGS. 6, 7, 8 and 9). The passages 170 and 172 are defined by channels 174 and 176 extending axially along the exterior of the cylinder means 44 and 46. The passages 170 and 172 terminate at an annular chamber 178 (FIG. 3) from which combustible charges pass through the bore 144 upon positional alignment of arcuate indentations 179 and 180 in the central shaft 48.

After charges of fuel are burned, the products of combustion are exhausted from the engine through an internal passage 182 which is defined inside the central shaft 48. Entry to the passage 182 is through radial ports 184 and 186 (see also FIG. 6) which cooperate with the sleeve 90 to provide a valving action. From the downstream end 188 (right) of the central shaft 48, exhaust gases pass into an impeller structure 190 to be forcefully expelled through a passage 192. The impeller structure simply includes a housing 193 as well known in such structures for cooperative relation with an impeller 194.

Considering the overall operation of the engine E in view of the above detailed structural description, it is to be noted at the outset that a two-cycle mode is involved. The phase relationship of the intake ports (indentations 162 and 164) and the exhaust ports 184, for example, in relation to the motion of the piston 92, is graphically described in FIG. 10. As indicated above, the position of the piston 92 with reference to the cylinder means 44 is described over a cyclic interval of time by the curve 76.

The position of the intake ports (defined by the indentations 162 and 164) is described by the curve 200 while the position of the exhaust ports 184 is described by the curve 202. Of course, as the intake and exhaust ports are both defined by the central shaft 48, the motions of these ports is of similar phase. The intake and exhaust flow patterns are indicated with reference to the curves 200 and 202 by shaded areas 204 and 206. The figure also indicates the intervals of the power stroke, as well as the exhaust and compression intervals.

As a comment here pertinent, it is to be noted that the valving operation is accomplished by a single sliding member, i.e. central shaft 48, offset by an operating angle of some 115° from the similar motion of a piston, e.g. piston 92. In general, it has been found desirable to provide the offset somewhat critically between 90° and 120°. That relationship is established and preserved by a pair of radially-extending arms 210 and 212 (FIG. 8) which are integral with the central shaft 48 and extend to dwell in the sinusoidal, closed guide groove 74. Thus, the complex motion of the central shaft 48 is identical to that of the remainder of the engine (with reference to the housing 40). However, the motion of the central shaft 48 is offset by an angle which is somewhat critically selected to lie between 90° and 120°. As indicated above, in the illustrative embodiment, the angular offset is 115°.

Figure 10:
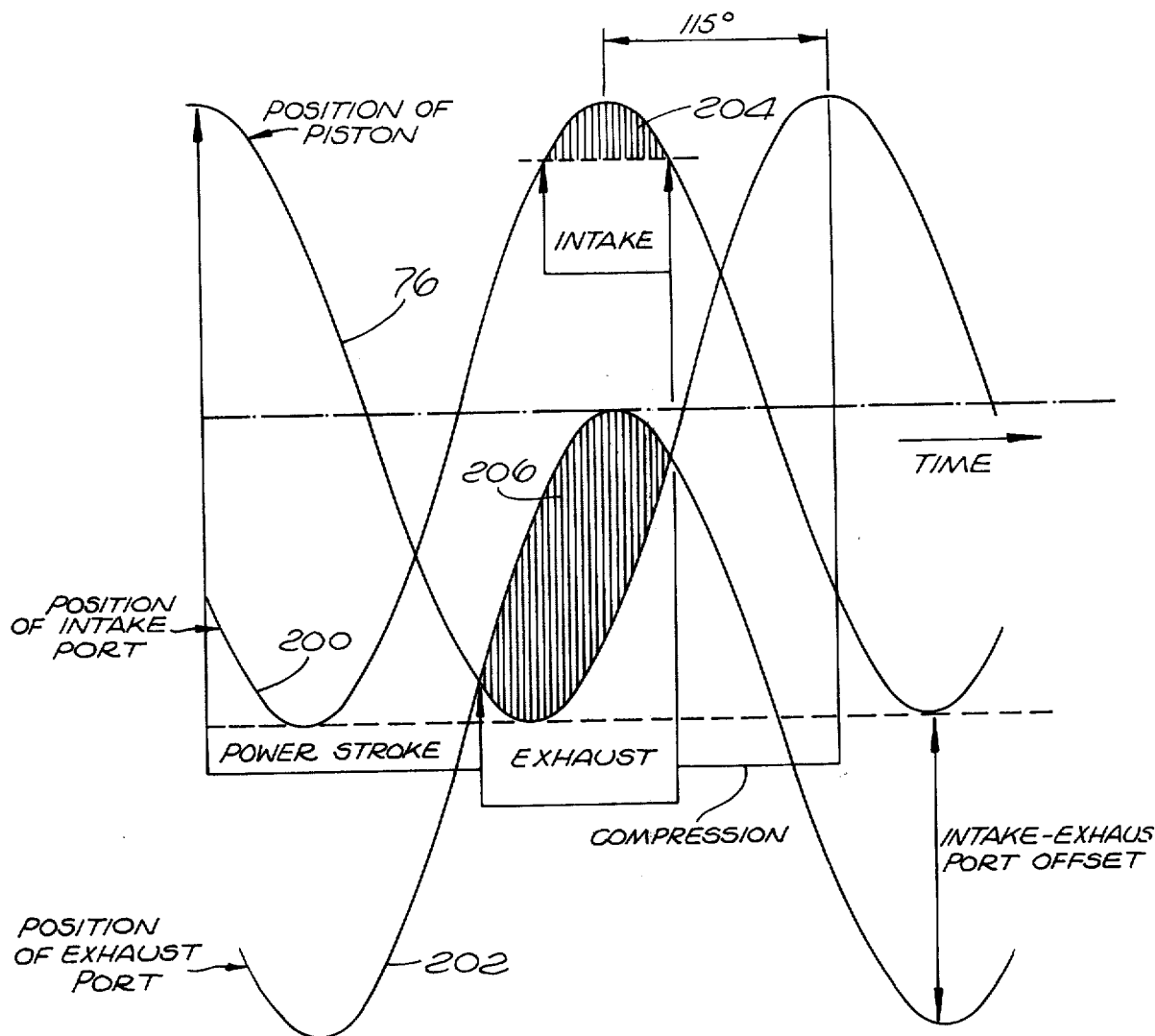
FIG. 10 is a graph illustrative of motion patterns in the system of FIG. 1.

Continuing to consider the detailed operation of the engine E, assume next that the positional relationship of the piston 92 (FIG. 3) is as indicated initially in FIG. 10, i.e. at the top of the stroke. At that instant, spark plugs 134 are energized to ignite the combustible charge initiating the production of expanding gases to power the piston 92. Consequently, the piston 92 is driven (to the right) with the central shaft 48 moving in the same direction for a brief interval prior to reversing its direction of movement. Of course, the piston 92 continues for a full stroke length prior to reversing.

Immediately prior to reversal of the piston 92, as depicted in FIG. 10, the positional relationship of the piston 92 with the central shaft 48 is such that exhaust flow is initiated. The exhaust flow continues during a rather substantial exhaust interval, a portion of which is concurrent with the intake interval. Accordingly, the products of combustion are substantially driven from the combustion chamber 50.

With the closure of the intake and exhaust ports (indicated at the terminal ends of the areas 204 and 206 in FIG. 10) the compression stroke is initiated with the result that the piston 92 returns to the head end of the cylinder means 44 preparatory to another cycle as described. The operation of the cylinder means 46 (opposed end) is precisely similar, however, one hundred eighty degrees out of phase. Of course, as indicated above, the reciprocating motion is established in a resonance state and translated to include a rotary motion which supplies output power in the form of a rotary torque.

The system of the engine E affords a number of important and distinct advantages. Specifically, the rotary output is smooth, convenient and additionally processes essentially only the energy of the output. The engine can be constructed in a relatively small size in relation to the power output and involves a relatively small number of parts in comparison with prior engines. Additionally, it is apparent that the engine may be inexpensively constructed as it requires no difficult or complex seals to be preserved. Still further, the engine enables certain operating characteristics which permit it to be relatively clean. Specifically, it is to be noted that fuel charges are introduced into each of the combustion chambers 50 and 52 at a location adjacent the spark plugs 134 and 136, respectively. As a consequence, the fuel content of a combustible charge may be varied so as to provide a relatively lean charge remote from the spark plugs 134 and 136 while being relatively rich adjacent the spark plugs. The relatively-rich fuel strata has a longer burning period as the burn moves through the combustion chamber. Therefore, more-complete combustion occurs with the result that a reduced quantity of live hydrocarbons appears in the exhaust stream.

As another consideration, the structure of the engine E (with the revolving combustion chambers 50 and 52) allows a rather-special mode of operation to be accomplished. Specifically, as the combustion chambers 50 and 52 revolve about a central axis, it is possible to introduce a quantity of water into the chambers 50 and 52 which is confined as a circumferential wall so as to permit effective burning of the fuel charge. However, as the fuel is burned, water from such a wall is evaporated to effectively and intimately cool the expanding gases. As a result, the water is vaporized and heated to accomplish a modified form of cycle. Of course, the operation may be considerably varied by the quantity of water introduced into the combustion chambers 50 and 52. For example, in one mode of operation, by avoiding high temperatures, contaminants in the form of nitrogen oxides are substantially eliminated. Additionally, in the course of handling the exhaust stream, the water (or other evaporable liquid) may be condensed, entrapping substantial quantities of contaminants either for filtration or appropriate disposal.

Figure 14:
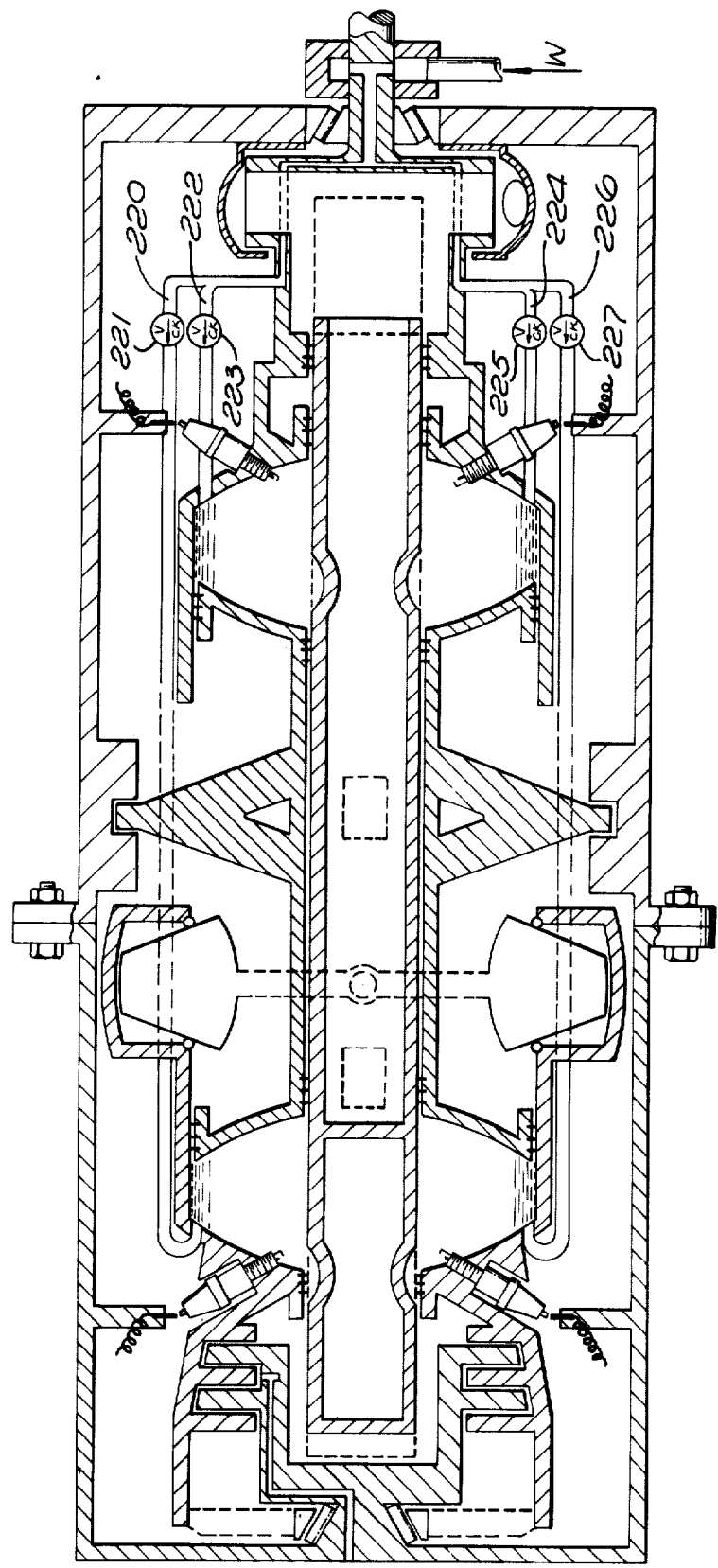
FIG. 14 is a view similar to FIG. 1 showing an alternative embodiment of the system.

A structural embodiment for the engine E similar to that disclosed above, however, modified to include water injection is illustrated in FIG. 14. Specifically, passages 220, 222, 224 and 226 containing check valves 221, 223, 225 and 227, respectively, are connected between an intake 228 and the interiors of the combustion chambers 50 and 52. Flow from the intake 228 to the combustion chambers results from centrifugal forces applied to water that is released to the intake 228. Of course, it may be desirable to meter specific quantities of water depending upon the desired mode of operation.

Figure 12:
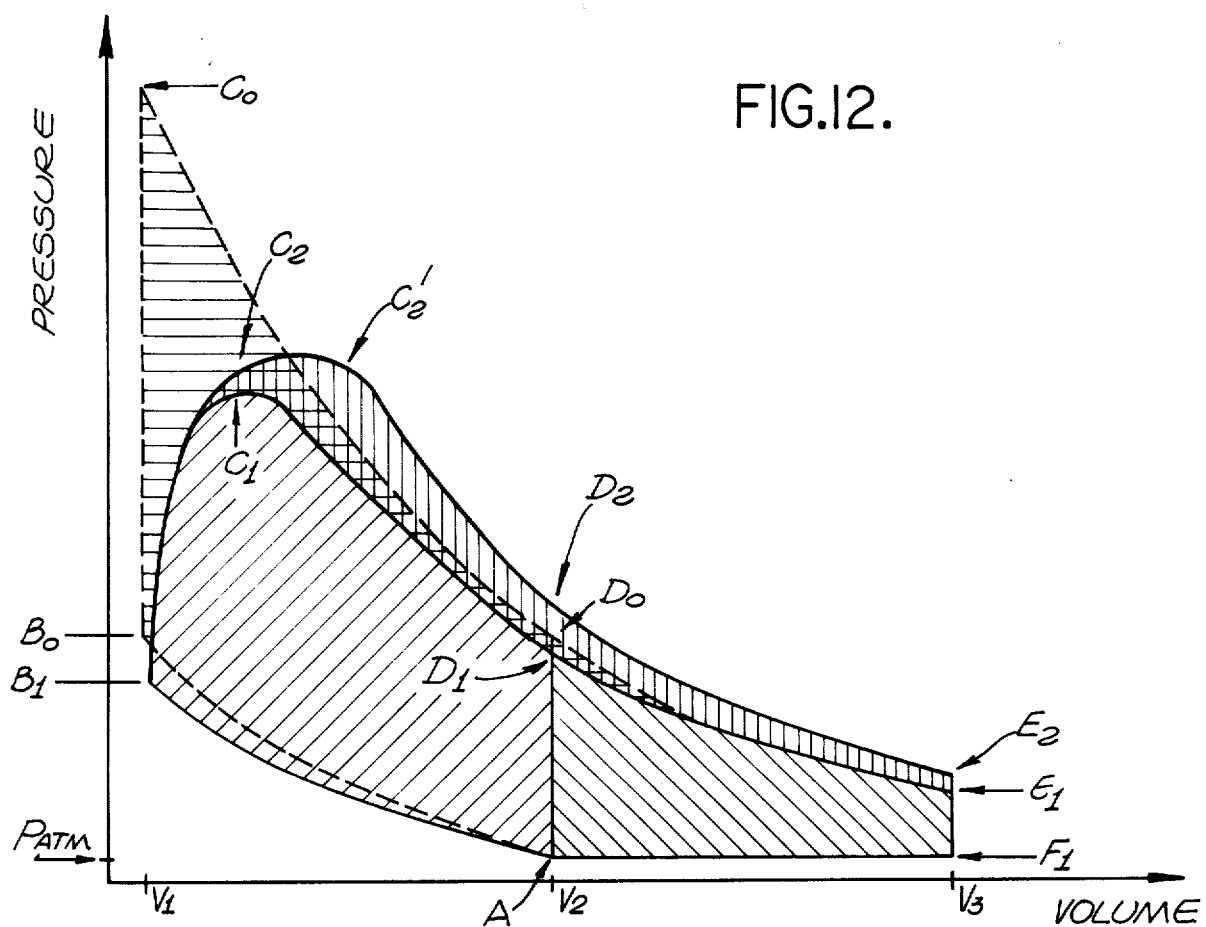
FIG. 12 is a pressure-volume diagram explanatory of systems of the present invention.

In view of the above detailed description of the engine portion of the system, reference will now be made to FIG. 12 in relation to the thermodynamic cycles in relation hereto. Generally, points are designated on the diagram by letters A through F. In that regard, similar points in different cycles are designated by the same letter, however, with a different subscript. Specifically, the theoretical Otto cycle is designated by the area A, $B_o$, $C_o$, $D_o$ and A. The line $A-B_o$ designates the compression stroke followed by the line $B_o-C_o$ (indicating combustion), $C_o-D_o$ (indicating expansion or the power stroke), and $D_o-A$ (indicating exhaust).

Generally, the theoretical Otto cycle is not attainable; rather, the practical cycle is as indicated by the area A, $B_1$, $C_1$, $D_1$, A. The area so bounded, of course, indicates the mechanical energy or work provided by the cycle. In that regard, it is to be noted that the difference between the theoretical and practical versions of the Otto cycle results from the loss of heat that is somewhat inherent in the cooling system. In that regard, lost energy may well amount to over one hundred percent of the useful mechanical work.

In the present system, the practical cycle is substantially expanded by providing a power stroke that is substantially increased over the length of the intake stroke. Specifically, the cycle may be described by the points A, $B_1$, $C_1$, $D_1$, $E_1$, $F_1$ and A. The compression stroke is defined by the line $A-B_1$, followed by the combustion stroke (line $B_1-C_1$) and the expansion or power stroke (line $C_1-D_1-E_1$). Thereafter, the exhaust is indicated by the line $E_1-F_1-A$, during which a fresh charge is also forced into the combustion chamber. It is thus apparent that the energy added to a conventional cycle is proportional to the area $A-D_1-E_1-F_1-A$ while the total mechanical energy produced is proportional to the area $A-B_1-C_1-E_1-F_1-A$, a substantial net increase.

In addition to the improvement described above, the cycle of the present invention is subject to further modification by the introduction of an intimate working fluid or evaporable liquid (water) into the combustion chamber. Such operation is productive of a hybrid steam cycle, described as: A, $B_1$, $C_2$, $C_2'$, $D_2'$, $E_2$, $F_1$, and A.

The quasi-constant pressure portion of the diagram ($C_2-C_2'$) is due to release and superheating of steam, a process extended in time beyond actual combustion. This branch is similar to the constant pressure branch occurring in the well known Diesel cycle. The branch defined by the points $C_2'-D_2-E_2$ is adiabatic, during which most of the heat otherwise flowing through the cylinder walls is absorbed by generating and superheating steam.

Due to centrifugal forces, any bubbles of steam in the mass or wall of water defined about the interior circumference of the combustion chambers 50 and 52 will be forced toward the axis of revolution and, thus, join the mass of expanding gas. Pressures and temperatures at point $D_2$ are higher than at the point $D_1$ of a conventional cycle due to the fact that heat energy is recovered by the steam. Therefore, the cycle is expanded to include the line $E_2-F_1$, to use that energy. The resulting increase in work is defined by the area $D_1-C_1-C_2-C_2'-D_2-E_2-E_1-D_1$ which represents a substantial part of the total cycle. As a consequence, a substantial energy otherwise dissipated as heat is recovered in the system.

Figure 13:
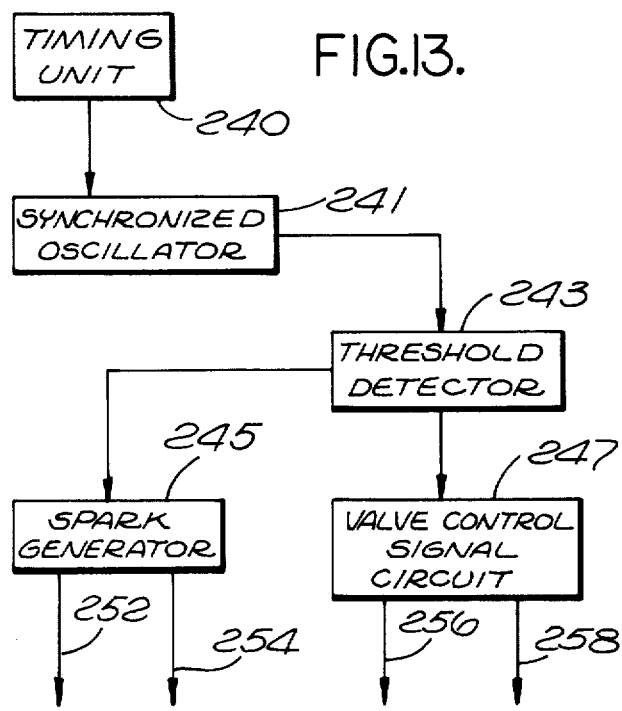
FIG. 13 is a block diagram of a control portion of the system of FIG. 1.

In the course of the above description, the timing for the ignition sparks and fuel charges were related to the curves of FIG. 10 which define the positional relationships. The structure for such control, as indicated above is contained in the control unit C. Of course, various synchronizing structures can be employed, one of which is preserved in synchronism by sensing the cyclic presence of the cam surfaces 84 and 86 (FIG. 3) at a specific location in relation to the housing 40. Of course, magnetic transducers for such a sensing operation are well known in the prior art, which may be used with a pulsing circuit to provide cyclic control pulses. Such a timing unit 240 is depicted in FIG. 13 and as indicated is connected to a synchronized oscillator 241 having an output that coincides to the waveform or curve 76 (FIG. 10).

The oscillator 241 is connected to a threshold-detector circuit 243 which functions to pulse a spark generator 245 and a valve-control circuit 247 at specifically related times. The spark generator 245 has a pair of outputs 252 and 254 for alternately energizing the spark plugs 134 and 136. Somewhat similarly, the circuit 247 has two outputs 256 and 258 for actuating fuel injection valves (not shown) located in the fuel delivery unit D (FIG. 1) to afford a variable fuel mixture in the combustion chambers. Of course, various forms of control units can be employed in association with engines of the present invention; and in that regard, scuh units are somewhat ancillary.

In view of the above considerations, it may be seen that the several features and advantages variously indicated in relation to the present system afford significant and important improvements. The system may be variously embodied in physical structures; consequently, the scope hereof is deemed to be as set forth in the following claims.

What is claimed is:

1. A gas-expansion engine comprising:

means defining expansion chamber means, including movable piston means for providing a reciprocal motion pattern upon expansion of gas in said chamber means;

means for expanding gas in said chamber means;

means for converting said reciprocal motion pattern of said piston means to revolve said means defining expansion chamber means;

force-displacement means for applying a force to said piston means, which force is related and opposed to the reciprocating displacement of said piston means; and means for coupling said means defining expansion chamber means to provide mechanical rotary energy.

2. A gas-expansion engine according to claim 1 wherein said force-displacement means is related to provide said motion pattern in mechanical resonance at varying frequency.

3. A gas-expansion engine according to claim 1 wherein said piston means moving in said reciprocal motion pattern is revolved about a central axis extending parallel to said reciprocal motion pattern.

4. A gas-expansion engine according to claim 2 further including means for supplying evaporable noncombustible liquid into said expansion chamber means.

5. A gas-expansion engine according to claim 1 wherein said expansion chamber means includes a central shaft extending concentrically within said piston means and a cylinder-wall means defining said expansion chamber means in a circular configuration concentric with said central shaft and to matingly receive said piston means.

6. A gas-expansion engine according to claim 5 wherein said central shaft defines valving ports for introducing combustible mixture into said expansion chamber.

7. A gas-expansion engine according to claim 6 wherein said central shaft further controls passages defined for exhausting expansion gases and further including means for coupling said central shaft to be controlled in relation to the position of said piston means.

8. A gas-expansion engine according to claim 7 wherein said central shaft controls the flow of combustible mixture with respect to the movement of said piston means, the displacement of which relation to compressing combustible mixture is lesser than the displacement in relation to expanding gases following combustion.

9. A gas-expansion engine according to claim 7 wherein said means for coupling maintains the sinusoidal motion of said central shaft phase-displaced from the similar motion of said piston means by an angle between about 90° and 120°.

10. A gas-expansion engine according to claim 3 wherein said means for defining expansion chamber means further includes means to introduce non-combustible, evaporable liquid into said expansion chamber means to provide an annular body of said liquid to interact with combustion and expansion processes.

11. A gas-expansion engine according to claim 1 wherein said expansion chamber means includes means for defining an annular containing surface, and wherein said engine further includes means for introducing non-combustible, evaporable liquid into said chamber means to provide a circumferential wall of said liquid on said annular containing surface to interact with combustion therein.

12. A gas-expansion engine comprising: at least one cylindrical combustion-expansion chamber means including matingly-received piston means, said chamber means and said piston means being coupled for revolution together about the cylindrical axis thereof;

valving means for introducing a combustible mixture into said chamber means and exhausting products of combustion therefrom;

force-displacement means for applying between said chamber means and said piston means a force related and opposed to axial displacement of said piston means to establish a mechanically resonant motion pattern in conjunction with the mass in reciprocation; and means for coupling said piston means, as to a load.

13. A gas-expansion engine according to claim 12 where the interaction of masses in linear motion with said force-displacement means results in mechanical resonance of the reciprocating motion of said piston means at a variable frequency proportional with the angular velocity of said chamber-piston means, to periodically store the energy for compression of gas in said chamber means.

14. A gas-expansion engine according to claim 13 where the frequency of resonant axial oscillations is an even integer multiple of the frequency of revolutions.

* * * * *